(12) United States Patent
Bauckman et al.

(10) Patent No.: US 8,984,605 B2
(45) Date of Patent: Mar. 17, 2015

(54) MULTI-FACTOR AUTHENTICATION

(75) Inventors: Dena Terry Bauckman, Irving, TX (US); Nigel Paul Johnson, Ottawa (CA); David Joseph Robertson, Richardson, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 304 days.

(21) Appl. No.: 13/215,757

(22) Filed: Aug. 23, 2011

(65) Prior Publication Data
US 2013/0055368 A1 Feb. 28, 2013

(51) Int. Cl.
*G06F 21/00* (2013.01)
*H04L 29/06* (2006.01)
*H04L 12/58* (2006.01)

(52) U.S. Cl.
CPC ............... *H04L 63/08* (2013.01); *H04L 51/24* (2013.01)
USPC .......................................................... 726/7

(58) Field of Classification Search
None
See application file for complete search history.

(56) References Cited

U.S. PATENT DOCUMENTS

| | | | | |
|---|---|---|---|---|
| 5,781,901 A | * | 7/1998 | Kuzma | 1/1 |
| 5,790,790 A | * | 8/1998 | Smith et al. | 709/206 |
| D399,836 S | * | 10/1998 | Wu et al. | D14/486 |
| 6,128,655 A | * | 10/2000 | Fields et al. | 709/219 |
| 6,192,407 B1 | * | 2/2001 | Smith et al. | 709/229 |
| 6,356,937 B1 | * | 3/2002 | Montville et al. | 709/206 |
| 6,684,248 B1 | * | 1/2004 | Janacek et al. | 709/225 |
| 6,732,101 B1 | | 5/2004 | Cook | |
| 7,293,239 B2 | * | 11/2007 | Gorbet et al. | 715/741 |
| 7,346,605 B1 | * | 3/2008 | Hepworth et al. | 1/1 |
| 7,475,256 B2 | | 1/2009 | Cook | |
| 8,151,327 B2 | * | 4/2012 | Eisen | 726/5 |
| 8,189,878 B2 | * | 5/2012 | Schultz | 382/115 |
| 8,341,712 B2 | * | 12/2012 | Machani | 726/7 |
| 2001/0037315 A1 | * | 11/2001 | Saliba et al. | 705/70 |
| 2003/0046533 A1 | * | 3/2003 | Olkin et al. | 713/152 |
| 2003/0144962 A1 | * | 7/2003 | Kobayashi | 705/57 |
| 2004/0199762 A1 | * | 10/2004 | Carlson et al. | 713/153 |
| 2005/0132020 A1 | * | 6/2005 | Gorbet et al. | 709/217 |
| 2007/0052672 A1 | * | 3/2007 | Ritter et al. | 345/156 |
| 2007/0250920 A1 | * | 10/2007 | Lindsay | 726/7 |
| 2009/0150675 A1 | * | 6/2009 | Cook | 713/175 |
| 2010/0114740 A1 | * | 5/2010 | Dominguez et al. | 705/27 |
| 2010/0193585 A1 | * | 8/2010 | Salyards et al. | 235/380 |

FOREIGN PATENT DOCUMENTS

WO WO 03/030474 4/2003
WO WO 2011/055002 5/2011

OTHER PUBLICATIONS

CNET (ZixMail published by CNET on Nov. 29, 2001 and updated on Jul. 18, 2009, found at http://reviews.cnet.com/software/zixmail/4505-3513_7-7820352.html).*

(Continued)

*Primary Examiner* — Peter Poltorak
(74) *Attorney, Agent, or Firm* — Baker Botts L.L.P.

(57) ABSTRACT

According to some embodiments, a method provides a designated link in a notification to an intended recipient of the message. The designated link includes a unique identifier associated with the message. Upon receiving a request to access the message, the method authenticates the request. Authentication includes verifying whether the request corresponds to the designated link provided in the notification. If the request passes authentication, the method communicates the message.

19 Claims, 2 Drawing Sheets

(56) References Cited

OTHER PUBLICATIONS

ZixCorp (ZixMessage Center Help published by ZixCorp on Sep. 28, 2010, found at http://www.zixcorp.com/support/zixport/zixmessage-center-help/).*

APD (apd.myflorida.com, Retrieving and Sending Secure E-Mail Messages, published on Dec. 1, 2008, found at http://appd.myflorida.com/securemail/instructions.htm).*

Notification of Transmittal of the International Search Report and The Written Opinion of the International Searching Autority, or the Declaration, PCT/US2012/051521; 9 pages dated Nov. 30, 2012.

* cited by examiner

MULTI-FACTOR AUTHENTICATION

FIELD OF THE INVENTION

The invention relates generally to authentication techniques and more particularly to multi-factor authentication.

BACKGROUND

In computing systems, authentication techniques may be used to verify the identity of a user or device attempting to access data. Authentication techniques may use one or more factors to verify that the user or device has permission to access the data. Examples of factors include usernames, passcodes (e.g., a string of one or more characters, such as letters, numbers, or punctuation marks), personal information (e.g., social security number or mother's maiden name), device information (e.g., a cookie stored on the device or a passcode generated by a token), and biometric data (e.g., a fingerprint or voiceprint). In general, an authentication technique may be made "stronger" by increasing the number and/or types of factors used to verify the user and/or device. Authentication techniques made stronger with known authentication factors, however, may be relatively inconvenient for the user. For example, the user may have to remember complicated passcodes, or the user may be required to have certain hardware (e.g., a token or a fingerprint scanner) to access the data.

SUMMARY

According to some embodiments, a method provides a designated link in a notification to an intended recipient of the message. The designated link includes a unique identifier associated with the message. Upon receiving a request to access the message, the method authenticates the request. Authentication includes verifying whether the request corresponds to the designated link provided in the notification. If the request passes authentication, the method communicates the message.

Some embodiments of the disclosure may provide one or more technical advantages. A technical advantage of certain embodiments may be that a multi-factor authentication procedure may evaluate a method used to access a message. For example, if a user requests access to the message through a designated link, it may be determined that the request has passed one of the authentication factors. Evaluating the method used to access a message may reduce the impact that the authentication procedure has on the user. For example, in certain embodiments, the user may be able to access the message from any machine through the designated link. As another example, in certain embodiments, the user may be sufficiently authenticated without having to answer a number of security questions and/or without having to use certain hardware (e.g., a token or a fingerprint scanner). A technical advantage of certain embodiments may be that a fallback authentication procedure may be initiated if the user fails to request access to the message through the designated link. The fallback authentication procedure may authenticate the request according to additional authentication factors.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
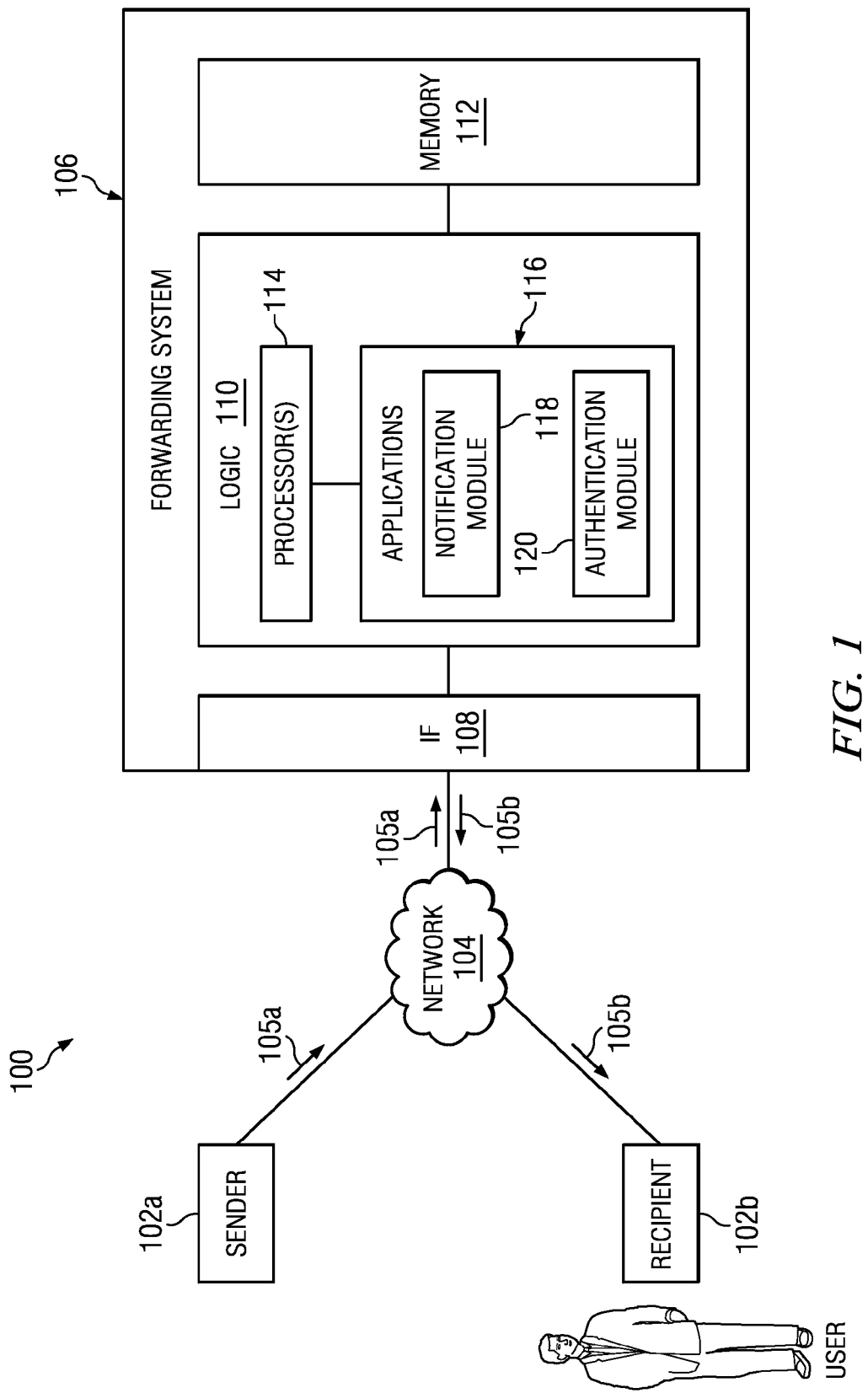
FIG. 1 illustrates an example of a system for securely communicating messages using multi-factor authentication.
Figure 2:
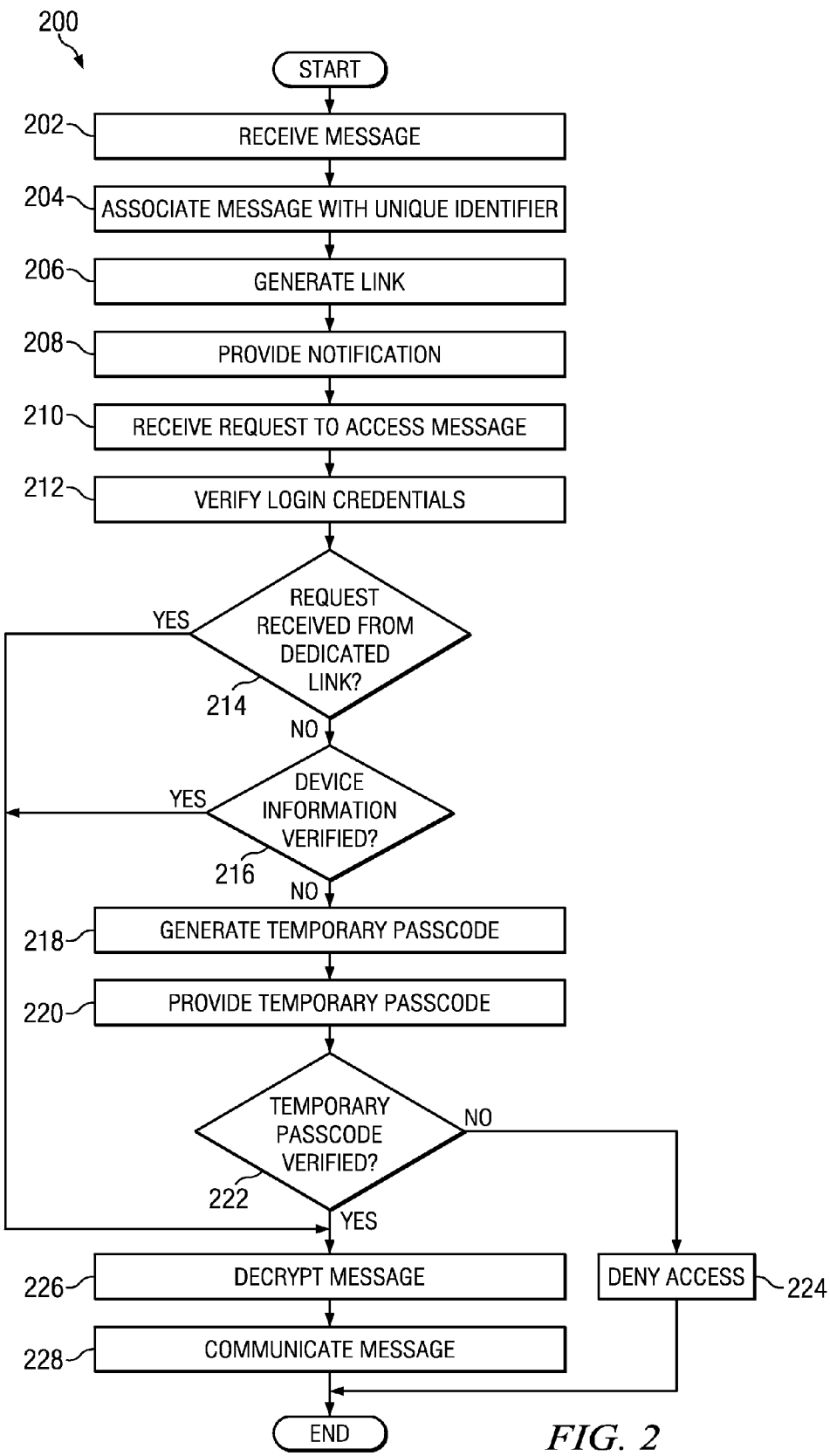
FIG. 2 illustrates an example of a method for securely communicating messages using multi-factor authentication.

Embodiments of the present invention are described in FIGS. 1-2 of the drawings, like numerals being used for like and corresponding parts of the various drawings.

FIG. 1 illustrates an example of a system 100 for securely communicating messages using multi-factor authentication. In the illustrated example, system 100 includes a plurality of clients 102, a network 104, and a forwarding system 106 coupled as illustrated.

Clients 102 may comprise hardware and/or software and may be configured as senders 102a or recipients 102b. In certain embodiments, sender 102a may generate a message 105. Sender 102a may generate message 105 automatically (e.g., in response to detecting a condition or an event) or in response to user input. Message 105 may include address information and/or message information. Address information identifies one or more intended recipients 102b to which the message information is directed. Examples of addresses include an email address, an IP address, a phone number, or other identifier associated with the intended recipient(s) 102b. Message information may include any information/content to be communicated to recipient 102b. Examples of message information include the body of an email or content associated with a web page, such as HTML content, XML instructions, etc. Message information may include text, drawings, photographs, video, audio, etc. Sender 102a may send message 105 over network 104.

In some embodiments, forwarding system 106 may facilitate communicating message 105 from sender 102a to recipient 102b. As an example, for security purposes, sender 102a may encrypt message 105 according to an encryption method. Examples of encryption methods include symmetric key encryption methods, such as DES or Triple DES encryption, public key encryption methods, such as x.509 encryption, or a combination of symmetric key and public key encryption methods, such as PGP or S/MIME encryption. For purposes of illustration, message 105a may refer to message 105 encrypted according to an encryption method supported by sender 102a.

If recipient 102b does not support a decryption method corresponding to the method used to encrypt message 105a, recipient 102b may be unable to access message 105a. Accordingly, sender 102a may send message 105a addressed to recipient 102b via forwarding system 106. Forwarding system 106 decrypts message 105a and communicates message 105b to recipient 102b. For purposes of illustration, message 105b may refer to message 105 encrypted according to an encryption method supported by recipient 102b.

In some embodiments, forwarding system 106 may initiate forwarding message 105 to recipient 102b by sending a notification to recipient 102b. The notification informs a user associated with recipient 102b that forwarding system 106 has received message 105 addressed to recipient 102b. In some embodiments, the notification includes a designated link that facilitates access to message 105. For example, the designated link may comprise a hyperlink that corresponds to a Uniform Resource Locator (URL) specifying where to locate message 105. The user may cause recipient 102b to request message 105 from forwarding system 106 by executing the designated link (e.g., clicking on the hyperlink).

In response to recipient 102b's request for message 105, forwarding system 106 may authenticate recipient 102b. For example, in certain embodiments, forwarding system 106 authenticates recipient 102b according to two steps. In the first step, forwarding system 106 prompts the user to provide login credentials via recipient 102b. Login credentials may include credentials for accessing an account that forwarding system 106 associates with the user. Examples of login credentials include a username and/or passcode. Upon verifying the login credentials, forwarding system 106 may proceed to the second step. The second step may verify whether the request for message 105 was received through the designated link. If the request for message 105 was received through the designated link, forwarding system 106 may determine that authentication has passed and may communicate message 105 to recipient 102b. In some embodiments, forwarding system 106 communicates with recipient 102b over a secure connection, such as a Secure Socket Layer (SSL) connection, a Transport Layer Security (TLS) connection, or other secure connection.

In the illustrated example, forwarding system 106 includes an interface (IF) 108, logic 110, and one or more memories 112. Logic 110 includes one or more processors 114 and applications 116, such as a notification module 118 and authentication module 120. In some embodiments, forwarding system 106 may include a secured webmail delivery portal that communicates notification messages according to Simple Mail Transfer Protocol (SMTP) or another email protocol. A ZixPort® provides one example of a secured webmail delivery portal. In some embodiments, forwarding system 106 may include one or more servers. A server may refer to any suitable combination of hardware and/or software implemented in one or more modules to process data and provide the described functions and operations. In some embodiments, the server may include, for example, a mainframe, host computer, workstation, web server, file server, a personal computer such as a laptop, or any other suitable device operable to process data. In some embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

Notification module 118 determines that forwarding system 106 has received message 105 addressed to recipient 102b and generates a notification. For example, notification module 118 may generate a designated link that facilitates access to message 105. In some embodiments, the designated link includes a unique identifier, such as a plurality of characters determined at random. The unique identifier facilitates associating the notification with a particular message 105 addressed to recipient 102b. As an example, the designated link may comprise a URL for accessing message 105, such as https://secure-forwarding.com/readmessage?index-a202fa80-48d61ad5-0824ab5b-cd705cf. In the example, the unique identifier may be "a202fa80-48d61ad5-0824ab5b-cd705cf." A particular unique identifier may be associated with message 105 independently of the encryption method used to encrypt message 105. Thus, the same unique identifier may be associated with message 105a and message 105b regardless of whether message 105a and message 105b are encrypted according to the same encryption method or different encryption methods.

The designated link may optionally include a user-readable portion and a machine-readable portion. The user-readable portion may be displayed to a user. The machine-readable portion may include the unique identifier and may be hidden from the user. As an example, for notifications provided by email, the user-readable portion may be displayed in the body of the email whereas the machine readable portion may not be displayed in the body of the email. In some embodiments, the user-readable portion may include a notification icon or notification language, such as "Message Waiting," and the machine-readable portion may include the URL associated with message 105. In some embodiments, the user-readable portion may include a portion of the URL. Continuing with the example described above, forwarding system 106 may display "https://secure-forwarding.com" as the user-readable portion. The remaining portion of the URL, including the unique identifier, may be hidden from the user.

Notification module 118 provides the notification to recipient 102b. Notification module 118 may send the notification to an email address, a telephone number, an IP address, or other address associated with recipient 102b. In certain embodiments, an email address to which the notification may be sent corresponds to a user email account, such as a webmail account offered through a web site. Examples of such web sites include GOOGLE GMAIL, MICROSOFT HOTMAIL, YAHOO! MAIL, or a proprietary web site (e.g., a web site provided within a particular organization). Providing the notification to the user email account may increase the security of message 105, for example, if the user is required to enter a passcode to access the user email account in order to retrieve the designated link to message 105.

Authentication module 120 receives authentication information from clients 102 (e.g., sender 102a and/or recipient 102b) and checks whether the authentication information is valid. Authentication information may include, but is not limited to, usernames, passcodes (e.g., a string of one or more characters, such as letters, numbers, or punctuation marks), personal information (e.g., social security number or mother's maiden name), device information (e.g., a cookie stored on the device or a passcode generated by a token), biometric data (e.g., a fingerprint or voiceprint), and combinations of the preceding.

Authentication module 120 determines that client 102 has passed authentication upon verifying a pre-determined authentication factor or combination of authentication factors indicated by an authentication procedure. For example, to authenticate recipient 102b, the pre-determined combination of factors may include login credentials associated with the user's forwarding system 106 account (e.g., the username and passcode for the user's secured webmail account, such as a ZixPort account) and one additional authentication factor that passes verification. By verifying the additional factor, an unauthorized user that somehow obtained the login credentials would generally be prevented from accessing forwarding system 106. Examples of the additional authentication factor include 1) access through the designated link, 2) a cookie stored by a particular computing system, 3) a temporary passcode, such as a passcode that forwarding system 106 has emailed to recipient 102b, and so on.

In certain embodiments, authentication module 120 may select the designated link as a preferred additional factor. Accordingly, if authentication module 120 determines that the request to access message 105 corresponds to the designated link, authentication module 120 may conclude that authentication has passed. If authentication module 120 determines that the request to access message 105 fails to correspond to the designated link, authentication module 120 may use another authentication factor (e.g., the cookie and/or the temporary passcode) in a fallback authentication procedure.

Any suitable method may be used to determine whether recipient 102b's request to access message 105 corresponds to the designated link. For example, authentication module may verify that the request includes the unique identifier associated with message 105. As described above, the designated link's unique identifier may optionally be in a machine-readable form that is hidden from the user. Thus, the request may fail verification in the event that a user merely copies the user-readable portion of the designated link into a web browser without providing the machine-readable portion of the designated link. In some embodiments, if the user types the user-readable portion into a web browser in an attempt to access message 105 independently of the designated link, forwarding system 106 may display a main web page to the user instead of message 105. The main web page may optionally prompt recipient 102b to provide additional authentication information according to the fallback authentication procedure. If recipient 102b fails the fallback authentication procedure, authentication module 120 may deny access to message 105. Upon passing authentication, forwarding system communicates message 105b to recipient 102b.

Client 102 may include any suitable combination of hardware and/or software, such as a computing system comprising one or more interfaces, logic, and/or one or more memories, which are described in more detail below. In some embodiments, client 102 may include an email application that may be executed from any suitable device, such as a desktop or laptop computer, a thin client, a telephone (e.g., cellular, mobile, or smart), a digital assistant (such as personal or enterprise), or a gaming device. Client 102 may communicate with network 104 via a wired or wireless connection. In certain embodiments, client 102 may be operable to display message 105 and/or the notification corresponding to message 105 on a display.

In some embodiments, client 102 may include a web browser application that supports a secure connection protocol (e.g., SSL, TLS). Client 102 may optionally include support for encrypting and/or decrypting messages 105. Even if client 102 does not include support for encrypting and/or decrypting messages 105, forwarding system 106 may encrypt and/or decrypt the messages on behalf of client 102. Alternatively, in some embodiments, forwarding system 106 may communicate message 105 between clients 102 without performing any decryption and/or encryption on behalf of client 102. As an example, if recipient 102b supports the same encryption method that sender 102a uses to encrypt message 105, forwarding system may communicate message 105 without performing decryption and/or encryption. As another example, the user may opt to send or receive unencrypted messages 105 in certain situations. Forwarding system 106 may authenticate client 102 and/or communicate messages 105 over a secure connection for increased security.

Although the preceding example has been described in the context of message 105 generated by sender 102a, in some embodiments forwarding system 106 may independently generate a message 105. As an example, a user may own a secured webmail account (e.g., a ZixPort account) hosted by forwarding system 106. Forwarding service may associate a user profile with the secured webmail account, for example, according to a username. The user profile may include a passcode and user preferences, such as a preferred email address, preferred security settings, and so on. If the user requests to make changes to the user profile, forwarding system 106 may generate a message with a designated link to a user profile webpage. Forwarding system 106 may authenticate the user's access to a the user profile webpage by verifying that the webpage was accessed through that designated link (e.g., based on a unique identifier included in the designated link).

Systems and apparatuses disclosed herein (such as client 102, network 104, and forwarding system 106) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network, such as network 104. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

FIG. 2 illustrates an example of a method 200 for securely communicating messages using multi-factor authentication. The method begins at step 202 where forwarding system 106 receives message 105a addressed to recipient 102b. At step 204, forwarding system 106 associates message 105a with a unique identifier. For example, forwarding system 106 may generate a random set of characters to uniquely identify message 105a. To provide security, the random set of characters may be relatively long and complex. Forwarding system 106 generates a designated link including the unique identifier at step 206. The designated link facilitates access to message 105b.

At step 208, forwarding system 106 provides a notification to recipient 102b. As an example, the notification may be provided to a user email account associated with recipient 102b. In certain embodiments, the user email account may be a webmail account offered through a web site, such as GOOGLE GMAIL, MICROSOFT HOTMAIL, YAHOO! MAIL, or a proprietary web site (e.g., a web site provided within a particular organization). The notification includes the designated link generated in step 206. In some embodiments, the designated link comprises a user-readable portion and a machine-readable portion that includes the unique identifier. The machine-readable portion may be hidden so that it does not appear in the body of the email (i.e., the portion of the notification viewed by the user). The user may login to the user email account to retrieve the notification. The user executes the designated link (e.g., clicks on the designated link) to cause recipient 102b to send forwarding system 106 a request to access message 105b.

Forwarding system 106 receives the request to access message 105b at step 210. In response to the request, forwarding system 106 initiates an authentication procedure, such as a multi-factor authentication procedure. In some embodiments, the first factor corresponds to authentication information known by the user. For example, forwarding system 106 may prompt the user to provide login credentials via recipient 102b. In some embodiments, the login credentials facilitate access to an account that forwarding system 106 associates with the user, such as a secured webmail account (e.g., a ZixPort account) hosted by forwarding system 106. The account may include message 105 and any other messages that forwarding system 106 associates with the user.

At step 212, forwarding system 106 verifies that the user provided valid login credentials, such as a username and/or passcode for the user's secured webmail account. Forwarding system 106 may deny access to message 105b if the user provided invalid login credentials. If forwarding system 106 determines that the first authentication factor passes authentication, forwarding system 106 may proceed to verify a second authentication factor.

In some embodiments, the second factor corresponds to authentication information possessed by recipient 102b. For example, forwarding system 106 may verify that recipient 102b possesses the designated link provided in step 208. Forwarding system 106 may determine that recipient 102b possesses the designated link if recipient 102b's request to access message 105b corresponds to the designated link. In some embodiments, the request corresponds to the designated link if it includes the unique identifier associated with message 105b. As described above, the unique identifier may be included in a machine-readable portion of the designated link that is hidden from the user. Thus, if the user attempts to access message 105b through a web browser by typing in a URL consisting of the user-readable portion of the designated link or a URL of forwarding system 106's main web page, the URL would fail to include the unique identifier and verification based on the designated link would fail. By contrast, if the user attempts to access message 105b by clicking on the designated link, the URL would include the unique identifier and verification based on the designated link would pass.

At step 214, forwarding system 106 determines whether the designated link passes verification. If the designated link passes verification, forwarding system may determine that authentication has passed and the method skips to step 222. That is, in some embodiments, if the user has provided valid login credentials and the request for message 105 was received through the designated link, forwarding system 106 determines that authentication has passed without having to verify any additional authentication factors. If the designated link does not pass verification (i.e., if the link fails to correspond to the designated link provided in step 208), the method continues to step 216 to initiate a fallback authentication procedure.

At step 216, forwarding system 106 verifies device information. In certain embodiments, forwarding system 106 may prompt recipient 102b to provide authentication information indicated by a cookie. As an example, recipient 102b may include an email application. The email application may be executed from a machine, such as a desktop or laptop computer, a telephone (e.g., cellular, mobile, or smart), a digital assistant (such as personal or enterprise), or a gaming device. Recipient 102b may check the machine executing the email application to determine whether the machine possesses the cookie. If forwarding system 106 has previously authenticated the particular machine, forwarding system 106 may have caused the cookie to be stored on that machine. Thus, the cookie facilitates subsequent attempts to access forwarding system 106 from the same machine. If the device information passes verification, the method skips to step 222. If the device information does not pass the verification, the method continues to step 218.

Forwarding system 106 generates a temporary passcode at step 218. In some embodiments, forwarding system 106 generates the temporary passcode in response to a determination that one or more authentication factors have failed and, thus, additional authentication is required. A temporary passcode may refer to a single-use passcode that is valid for a relatively short time period, such as one month, one week, one day, one hour, 15 minutes, or other suitable time period.

At step 220, forwarding system 106 provides the temporary passcode. As an example, forwarding system 106 emails the temporary passcode to the user email account. Forwarding system 106 may determine the address for the user email account from a stored user profile according to the username or other suitable criteria. The user logs in to the user email account to retrieve the temporary passcode and provides the temporary passcode to forwarding system 106 via recipient 102b.

Forwarding system 106 verifies the temporary passcode at step 222. To verify the temporary passcode, forwarding system 106 confirms that the temporary passcode received from the user corresponds to the temporary passcode provided by forwarding system 106 in step 220. If the temporary passcode passes verification, forwarding system 106 may provide a cookie (such as the cookie described in step 216) to be stored on the authenticated machine (i.e., the machine that provided the temporary passcode). The cookie may facilitate the particular recipient 102b's future access to forwarding system 106 from the authenticated machine. If the temporary passcode passes verification, the method skips to step 226. If the temporary passcode fails verification, the method may proceed to step 224 where forwarding system 106 denies access to message 105.

Upon passing authentication, the method continues to step 226 where forwarding system 106 decrypts message 105a and/or encrypts message 105b according to an encryption method supported by recipient 102b. At step 228, forwarding system 106 communicates message 105b to recipient 102b. In some embodiments, forwarding system 106 communicates with recipient 102b over a secure connection, such as a Secure Socket Layer (SSL) connection, a Transport Layer Security (TLS) connection, or other secure connection. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order. For example, the methods may authenticate more, fewer, or other authentication factors, and the authentication factors may be verified in any suitable order.

Some embodiments of the disclosure may provide one or more technical advantages. A technical advantage of certain embodiments may be that a multi-factor authentication procedure may evaluate a method used to access a message. For example, if a user requests access to the message through a designated link, it may be determined that the request has passed one of the authentication factors.

Evaluating the method used to access a message may reduce the impact that the authentication procedure has on the user. For example, the user may be able to access the message from any machine through the designated link. In certain embodiments, device independence may be facilitated by providing the designated link to a user's webmail account. Thus, the user may access the message from any machine operable to connect to the webmail service, for example, over the Internet.

A technical advantage of certain embodiments includes sufficiently authenticating a user without requiring the user to answer a number of security questions and/or without requiring the user to have certain hardware (e.g., a token or a fingerprint scanner).

A technical advantage of certain embodiments may be that a fallback authentication procedure may be initiated if the user fails to request access to the message through the designated link. The fallback authentication procedure may authenticate the request according to additional authentication factors.

Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
providing, by a processor operable to execute logic encoded on one or more non-transitory computer-readable media, a notification to an intended recipient of a message, the notification including a designated link operable to facilitate access to the message, the designated link including a unique identifier associated with the message, the unique identifier generated for the message and distinct from login credentials, wherein the unique identifier is not displayed to a user;
receiving a request to access the message;
authenticating the request according to an authentication procedure, the authentication procedure including selecting which authentication factors are to be verified based on whether the request corresponds to the designated link, wherein:
the request corresponds to the designated link if the request includes the unique identifier from the notification provided to the intended recipient;
the selected authentication factors correspond to login credentials if the request includes the unique identifier such that authentication is successful once valid login credentials associated with the intended recipient have been received; and
the selected authentication factors correspond to login credentials and at least one additional authentication factor only if the request fails to include the unique identifier; and
communicating the message if the request passes authentication.

2. The method of claim 1, further comprising:
sending a request for the login credentials associated with a user, the request for login credentials sent in response to the request to access the message.

3. The method of claim 1, wherein the recipient corresponds to an email account.

4. The method of claim 1, wherein:
the designated link comprises a user-readable portion and a machine-readable portion, the machine-readable portion including the unique identifier; and
the notification configured to display the user-readable portion to a user and to hide the machine-readable portion from the user.

5. The method of claim 1, wherein:
the message comprises an encrypted message; and
communicating the message comprises:
decrypting the message; and
communicating the message over a secure connection.

6. The method of claim 1, further comprising:
determining that the request fails to correspond to the designated link provided to the intended recipient; and
initiating a fallback authentication procedure.

7. The method of claim 1, wherein the unique identifier portion of the designated link is hidden from the user such that if the request only includes a portion of the designated link that is visible to the user, the method determines that the request fails to include the unique identifier and therefore fails to correspond to the designated link.

8. One or more non-transitory computer-readable media comprising logic, the logic when executed by one or more processing units operable to perform operations comprising:
providing a notification to an intended recipient of a message, the notification including a designated link operable to facilitate access to the message, the designated link including a unique identifier associated with the message, the unique identifier generated for the message and distinct from login credentials, wherein the unique identifier is not displayed to a user;
receiving a request to access the message;
authenticating the request according to an authentication procedure, the authentication procedure including selecting which authentication factors are to be verified based on whether the request corresponds to the designated link, wherein:
the request corresponds to the designated link if the request includes the unique identifier from the notification provided to the intended recipient;
the selected authentication factors correspond to login credentials if the request includes the unique identifier such that authentication is successful once valid login credentials associated with the intended recipient have been received; and the selected authentication factors correspond to login credentials and at least one additional authentication factor only if the request fails to include the unique identifier; and communicating the message if the request passes authentication.

9. The media of claim 8, the logic further operable to perform the operations comprising:

sending a request for the login credentials associated with a user, the request for login credentials sent in response to the request to access the message.

10. The media of claim 8, wherein the intended recipient corresponds to an email account.

11. The media of claim 8, wherein:

the designated link comprises a user-readable portion and a machine-readable portion, the machine-readable portion including the unique identifier; and the notification configured to display the user-readable portion to a user and to hide the machine-readable portion from the user.

12. The media of claim 8, wherein:

the message comprises an encrypted message; and
communicating the message comprises:
  decrypting the message; and
  communicating the message over a secure connection.

13. The media of claim 8, the logic further operable to perform the operations comprising:

determining that the request fails to correspond to the designated link provided to the intended recipient; and initiating a fallback authentication procedure.

14. A system, comprising:

one or more processors operable to execute logic encoded on one or more non-transitory computer-readable media in order to:

provide a notification to an intended recipient of a message, the notification including a designated link operable to facilitate access to the message, the designated link including a unique identifier associated with the message, the unique identifier generated for the message and distinct from login credentials, wherein the unique identifier is not displayed to a user;

receive a request to access the message;

authenticate the request according to an authentication procedure, the authentication procedure including selecting which authentication factors are to be verified based on whether the request corresponds to the designated link, wherein:

the request corresponds to the designated link if the request includes the unique identifier from the notification provided to the intended recipient;

the selected authentication factors correspond to login credentials if the request includes the unique identifier such that authentication is successful once valid login credentials associated with the intended recipient have been received; and the selected authentication factors correspond to login credentials and at least one additional authentication factor only if the request fails to include the unique identifier; and communicate the message if the request passes authentication.

15. The system of claim 14, the one or more processors further operable to:

send a request for the login credentials associated with a user, the request for login credentials sent in response to the request to access the message.

16. The system of claim 14, wherein:

the designated link comprises a user-readable portion and a machine-readable portion, the machine-readable portion including the unique identifier; and the notification configured to display the user-readable portion to a user and to hide the machine-readable portion from the user.

17. The system of claim 14, the authentication procedure further including verifying authentication information corresponding to at least one of a username, a passcode, personal information, device information, or biometric data.

18. The system of claim 14, wherein:

the message comprises an encrypted message; and
the one or more processors further operable to:
  decrypt the message; and
  establish a secure connection for communicating the message.

19. The system of claim 14, the one or more processors further operable to:

determine that the request fails to correspond to the designated link provided to the intended recipient; and initiate a fallback authentication procedure.

\* \* \* \* \*